UNITED STATES PATENT OFFICE.

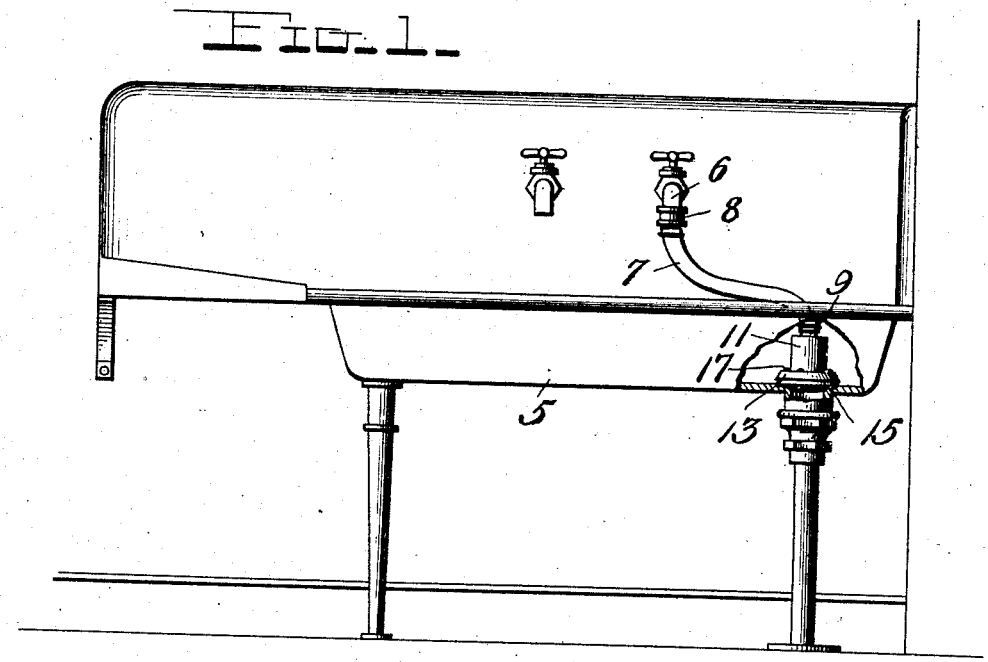
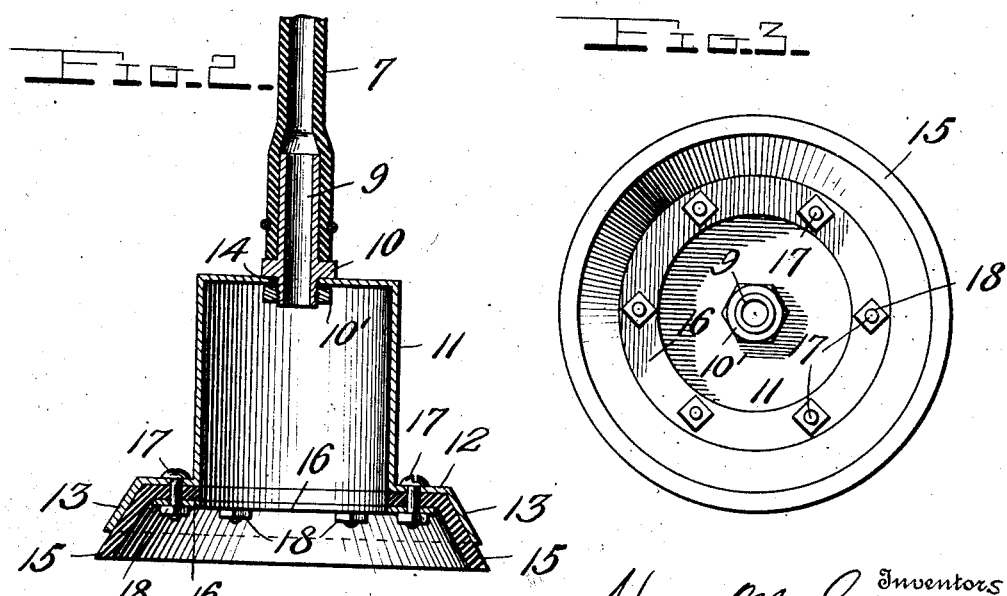

HARRY M. SMITH AND DANIEL KENEVEN, OF DENVER, COLORADO.

FLUSHING DEVICE.

958,841.  Specification of Letters Patent.  Patented May 24, 1910.

Application filed January 4, 1910. Serial No. 536,415.

*To all whom it may concern:*

Be it known that we, HARRY M. SMITH and DANIEL KENEVEN, citizens of the United States, residing at Denver, in the county of Denver and State of Colorado, have invented certain new and useful Improvements in Flushing Devices, of which the following is a specification, reference being had to the accompanying drawings.

This invention relates to certain new and useful improvements in flushing devices for sinks, washbowls, grease traps and the like, and has for its object to provide an improved device of this character which is of great convenience, simplicity, and effectiveness.

Another object is to provide a flushing device for the purpose specified which is adapted for use by persons without skill or experience in the use of flushing apparatus.

A further object of the invention is to provide a device which may be quickly attached to the faucet or spigot, and is easily and effectively operated without necessitating undue manual labor.

With these and other objects in view, the invention consists of the novel construction, combination and arrangement of parts hereinafter fully described and claimed and illustrated in the accompanying drawings, in which—

Figure 1 is a section through one end of a sink showing the application of our improved flusher; Fig. 2 is an enlarged vertical section through the suction head; and Fig. 3 is an end elevation of the head.

Referring to the drawings 5 indicates a sink of ordinary form usually found in the kitchens of private residences, and 6 is the spigot or faucet which supplies the water thereto from the main pipe. One end of a flexible hose 7 is provided with a coupling head 8 for attachment to the faucet said hose being preferably formed of rubber and provided in its other end with a screw threaded shank 9. This shank is formed with a peripheral flange 10 adjacent to its outer end, and the projecting end portion of the shank is provided with exterior screw threads.

The coupling head 11 comprises a cylindrical tubular portion which is flanged at its outer end as shown at 12 and a laterally inclined circumscribing flange 13 extends from the edge of the flange 12. The other end of the cylindrical body portion of the suction head has an opening 14 formed centrally therein which is adapted to receive the threaded extension of the shank 9. A nut 10' has threaded engagement on the end of the shank and frictionally engages the inner surface of the closed end of the suction head whereby the head is securely retained in position thereon. A flexible member 15 is seated in the outer end of the suction head upon the flanges 12 and 13 thereof. This member extends beyond the edge of the flange 13 and is adapted to be firmly held in engagement with the surface of the sink by the suction created within the head in the operation of the device. This flexible member is secured in the end of the head by means of the annular plate or ring 16 which is disposed upon the same on the flange 12. A plurality of threaded bolts 17 are disposed through openings in the flange and in the ring 16. Nuts 18 are threaded upon the outer ends of these bolts and are securely engaged upon the ring 16 whereby the flexible suction member 15 is securely held within the flanged end of the head.

In the operation of the device the flexible hose 7 is attached to the spigot or faucet and the water turned into the same. The flexible suction member 15 is positioned over the perforated plate usually disposed in the upper end of the drain pipe. As above stated the suction which is induced will cause the outwardly extending circumscribing edge portion of the member 15 to closely adhere to the surface of the sink and retain the head in its proper position over the drain pipe. The water will be discharged through the end of the tubular shank 9 and into the cylindrical portion of the head 11. It will strike the perforated plate in the drainage pipe with considerable force and effectively remove grease, dirt, or other foreign matter which has accumulated in the opening thereof. In this manner the drain pipes of sinks, washbowls, grease traps, etc., may be very quickly and effectively relieved of the matter which has accumulated therein and which often results in the complete shut off of the flow of water through the drainage pipe, the sink or bowl being unfit for further use.

While we have shown and described the preferred embodiment of our invention it will be understood that the same is susceptible of numerous minor changes in the form, proportion, and details of construction, without departing from the essential features or sacrificing any of the advantages thereof.

Having thus described the invention, what is claimed is:

1. A device of the class described comprising a flexible hose adapted for attachment to a spigot or faucet, a suction head removably secured to the free end of said hose, said head consisting of a tubular body portion, the end of said body portion being transversely and laterally flanged, a flexible suction member seated on said flanges and extending beyond the circumscribing edge thereof, a securing plate disposed upon said member, and a plurality of bolts extending through the transverse flange of said head and through said plate having nuts threaded on their outer ends to secure the suction member in position.

2. A device of the character described comprising a flexible tube having removable connection to a spigot or faucet, a suction head removably secured on the free end of said tube, the outer end of said head being formed with a transverse circumscribing flange, an outwardly inclined flange extending laterally from the transverse flange, a flexible suction member seated on said flanges, an annular plate disposed upon said member, and a plurality of bolts extending through said transverse flange and plate having nuts threaded on their outer ends to secure the suction member in position.

3. A device of the character described comprising a flexible tube adapted for detachable connection to a water spigot or faucet, a tubular shank disposed in the outer end of said tube having a peripheral flange adjacent to its outer end, the extremity of said shank being exteriorly threaded, a suction head having a cylindrical tubular body portion, one end thereof being closed and provided with a central opening to receive the end of said shank, a nut threaded upon said shank, the body portion of said head having a transversely extending circumscribing flange on its outer end, an outwardly inclined annular flange formed on the edge of said transverse flange, a flexible suction member disposed upon the inner faces of said flanges, an annular plate disposed upon said member, and a plurality of bolts disposed through the transverse flange, the suction member and said plate, said bolts having nuts threaded on their outer ends to secure the suction member in position.

In testimony whereof we hereunto affix our signatures in the presence of two witnesses.

HARRY M. SMITH.
DANIEL KENEVEN.

Witnesses:
ALEXANDER M. SMITH,
S. P. WILLIAMS.